Figure 1:
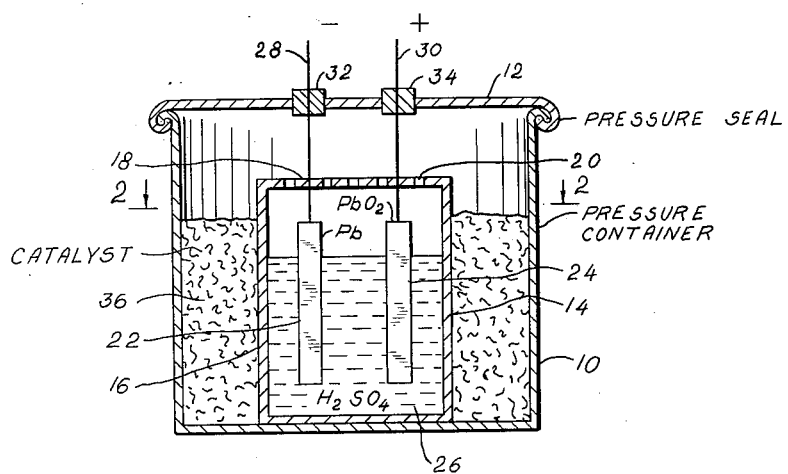

June 28, 1966     K. V. KORDESCH     3,258,360

HERMETICALLY SEALED SECONDARY BATTERIES

Filed June 27, 1962

INVENTOR.
KARL V. KORDESCH

BY *John R. Moherty*

ATTORNEY

3,258,360
HERMETICALLY SEALED SECONDARY BATTERIES
Karl V. Kordesch, Lakewood, Ohio, assignor to Union Carbide Corporation, a corporation of New York
Filed June 27, 1962, Ser. No. 205,717
7 Claims. (Cl. 136—6)

This invention concerns secondary batteries and refers more particularly to storage batteries of the lead-acid type. More specifically, the invention concerns the provision of catalysts for the recombination of hydrogen and oxygen gases, which are evolved in a lead-acid storage battery.

It has long been a goal of the battery industry to produce a truly hermetically sealed battery of the lead-acid type. To date this has not been possible due to the gassing problems associated with the lead-acid system.

Spill proof lead-acid batteries which depend on immobilization of the electrolyte are well known. However, such batteries are of little use for operations requiring long term cycling and furthermore, they are not true hermetically sealed batteries inasmuch as the generated gases must be vented by some suitable means.

While there has been considerable past interest in catalysts for the recombination of hydrogen and oxygen gases evolved in a lead-acid battery, none of the various means which have been developed have led to the production of a practical hermetically sealed battery. It is believed that the failure to produce a practical battery of this type is due, in large measure, to the inability of the heretofore known recombination devices and catalysts to effectively maintain the gas pressure in the battery at safe levels particularly during charging of the battery.

It is an object of the invention to provide a stable hermetically sealed rechargeable battery which has a long life. It is a further object to provide a hermetically sealed battery in which the accumulation of large volumes of hydrogen and oxygen gases is prevented. It is a still further object to effect the recombination of hydrogen and oxygen gases to form water and the ultimate reabsorption of this water by the electrolyte, thus maintaining the electrolyte in an operable condition.

According to the invention, these and other related objects are attained by providing a hermetically sealed container for a storage battery, and within the container, a recombination catalyst which is deposited on a high surface area porous base. The recombination catalyst is so disposed within the container as to allow hydrogen and oxygen gas evolved at the electrodes to contact the catalyst, but at the same time to prevent contact between the catalyst and the electrolyte. The term "recombination catalyst" is intended to mean a material capable of initiating the reaction between hydrogen and oxygen to form water or of increasing the rate of this reaction.

The arrangement of the components which make up the hermetically sealed lead-acid battery is not critical with the exception that the electrolyte must never be allowed to contact the catalyst. The actual design can be adapted to the particular employment of the battery. Liquid barriers can be incorporated in the design to allow the battery to be placed in various positions.

The hermetic seal can be achieved by any convenient means such as crimping, rolling, drawing or other similar procedures.

More specifically, the recombination catalyst employed in the present invention consists of a noble metal or a combination of noble metals which is deposited on the surface of a suitable high surface area supporting base such as activated carbon, activated alumina, activated silica or a suitable ceramic material.

The term "noble metal" as used herein, including the appended claims, is intended to define the platinum family metals of Group VIII of the Periodic Table. Suitable noble metals which may be used in the practice of this invention include rhodium, palladium, platinum, ruthenium, iridium, and osmium.

The base material, upon which the noble metals are deposited, may be selected from those available high surface area materials which are commonly used in the field of catalysts, e.g., carbon, alumina, silica and the like. A desirable range of particle size is from about 0.5 to about 4.0 millimeters and may be prepared by any of the well known methods of preparing activated materials in a particulate form.

A preferred base material is carbon which has been activated by a stream of carbon dioxide at a temperature below 1000° C.

It has been found that activated carbon or alumina having a surface area of from about 100 to about 500 square meters per gram is capable of providing satisfactory performance. A preferred activated carbon material has a surface area of approximately 300 square meters per gram.

The amount of noble metal which is deposited on the supporting base may range from about 0.1 to about 10 milligrams of metal per gram of base. The actual amount employed will depend to a large extent on the characteristics of the battery and the condition under which the battery is intended to operate. A satisfactory catalyst material is an 80 weight percent rhodium; 20 weight percent palladium mixture deposited on a base of activated carbon to the extent of about 0.5 milligram per gram of carbon.

Figure 2:
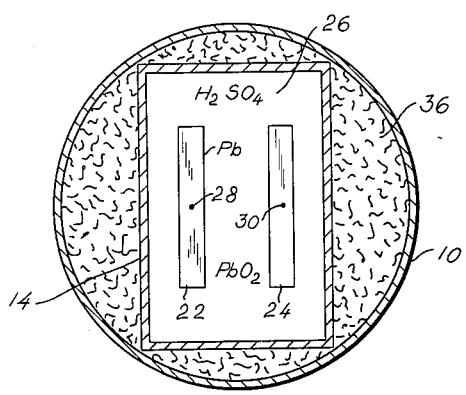

In the accompanying drawing:
FIG. 1 is a schematic sectional view of a hermetically sealed battery embodying the invention; and
FIG. 2 is a plan view taken along the line 2—2 in FIG. 1.

Referring now to the drawing and particularly to FIG. 1, there is shown a hermetically sealed lead-acid battery embodying the invention. As shown, the battery comprises an outer container 10 having a cover 12 hermetically sealed to its upper end. Disposed within the container 10 is a cell compartment 14 having side walls 16 and top 18 which is provided with a plurality of vents 20. Within the cell compartment 14 is a negative electrode or anode 22 of lead and a positive electrode or cathode 24 of lead oxide which are both immersed in a sulfuric acid electrolyte 26. The anode 22 and the cathode 24 are connected to an external circuit (not shown) by leads 28 and 30, respectively. The leads 28 and 30 pass through the top 18 of the cell compartment 14 and thence through gas-tight insulating seals 32 and 34 which are provided in cover 12.

Surrounding the cell compartment between the walls 16 and the container 10 is a recombination catalyst 36. By this construction, it will be noted that the side walls 16 physically separate the catalyst 36 from the electrolyte 26.

The hydrogen and oxygen gases which are evolved thus pass through the plurality of vents 20 located in the top 18 of the cell compartment 14 and are absorbed into the porous catalyst 36. The very large surface area of the catalyst provides in effect a gas reservoir which is capable of taking up any non-stoichiometric quantities of either hydrogen or oxygen. When the gases are present in stoichiometric amounts the catalyst effects recombination of the gas and formation of water. As a consequence of this reaction the pressure inside the system decreases. The water which is formed is absorbed on the surface of the catalyst and subsequently evaporates. Evaporation of the water is facilitated by the large surface area of the catalyst. The water vapor is eventually reabsorbed by the hygroscopic sulfuric acid electrolyte thus maintaining the concentration of the electrolyte within operative limits. In this connection the preferred concentration of sulfuric acid for good electrode performance coupled with rapid uptake of water formed on the catalyst is about 60 weight percent sulfuric acid. If a higher water capacity is desired, an additional reversible drying agent, such as silica gel, can be added to the catalyst bed.

In the practice of the invention, the recombination catalyst may be prepared by coating the base material with an aqueous solution of a noble metal salt, e.g., a chloride, nitrate, acetate, and the like. The salt is then thermally decomposed in a hydrogen atmosphere and the metal is then deposited on the surface of the base material. For example, a 10 percent solution of chloroplatinic acid or of rhodium trichloride may be used. The coated base material then is heated in a hydrogen atmosphere at about 400° C.

The catalyst may also be prepared by coating a suitable base material with a solution of halogen salt of the desired noble metal or metals. In this instance the salt is dissolved in a mildly reducing polyhydric compound having a boiling point between 150° C. and 300° C. The admixture is then heated at a temperature above the boiling point of the polyhydric compound but below the temperature at which the base material would be damaged. The heating should be continued for a period of time sufficient to cause reduction of the salt and deposition of the catalyst on the porous base material.

Suitable polyhydric compounds are ethylene glycol, propylene glycol, diethylene glycol and triethyene glycol.

The temperature at which the reduction and deposition is carried out is generally between 190° C. and 300° C. and preferably between 250° C. and 270° C. A preferred heating period is from about 30 minutes to about 2 hours under these conditions.

Alternatively, the noble metal catalyst may be prepared by coating the base material with an aqueous solution or suspension of the noble metal salt and ammonium formate. The pH of the solution suspension should be maintained between 4 and 9 for best results. The solution is applied to the base material and the coated substrate is then heated to at least 180° C. and preferably from 240° C. to 260° C. for a period of time sufficient to allow deposition of the finely-divided metal and to volatilize all remaining components of the solution. Normally a two-fold excess of ammonium formate above that required to form the metal is used.

The following will serve to further illustrate the hermetically sealed lead-acid battery of the present invention.

A hermetically sealed lead-acid battery was prepared by placing an open lead-acid cell rated at 6 amps. at 2 volts in a round container 5 inches high and having a diameter of 3 inches. Electrical leads were brought out through gas-tight fittings in the hermetically sealed top of the container. The recombination catalyst consisted of 50 grams of 8 mesh activated carbon having 300 square meters of surface area per gram. Twenty-five milligrams of rhodium (80%):palladium (20%) metal were deposited on the surface of the activated carbon. The recombination catalyst was placed in the battery as shown in FIG. 1.

The battery was then charged at 800 milliamps and discharged at 800 milliamps on a regular basis over a period of three weeks. The pressure inside the container was measured after each period of discharge and charge. As can be seen by reference to Table I there was no excessive buildup of pressure.

TABLE I

*Variation of pressure during charge, discharge, and overcharge sealed lead-acid cell No. 14; rating 6 amps., 2 volts*

| Charge at 800 ma. | Discharge at 800 ma. | Time, Hrs. | Open Circuit Voltage | Pressure (p.s.i.) Initial | Pressure (p.s.i.) Final |
|---|---|---|---|---|---|
| X |   | 6.4 |   | 0 | 10 |
| X |   | 5.1 |   | 4 | 18 |
|   | X | 5.1 | 2.10 | 14 | 14 |
| X |   | 1.0 |   | 14 | 14 |
| X |   | 6.3 |   | 13 | 15 |
| X |   | 6.4 |   | 16 | 25 |
|   | X | 6.1 | 2.10 | 33 | 34 |
|   |   | 1.2 |   | 34 | 34 |
| X |   | 6.4 | 1.99 | 35 | 38 |
| X |   | 6.4 | 2.09 | 43 | 38 |
| X |   | 6.4 | 2.14 | 22 | 21 |
|   | X | 4.5 | 2.02 | 22 | 22 |
|   |   | 1.6 |   | 22 | 22 |
| X |   | 6.4 | 2.02 | 20 | 20 |
| X |   | 6.4 |   | 20 | 24 |
| X |   | 6.4 | 2.15 | 20 | 19 |
| X |   | 6.2 | 2.12 | 15 | 18 |
|   | X | 4.8 | 2.10 | 20 | 20 |
| X |   | 8 | 2.02 | 19 | 20 |
| X |   | 7.7 | 2.09 | 21 | 26 |

The particular embodiments of the invention shown above are intended to be illustrative and should not be considered as limiting since the invention is subject to changes and adaptations. For example, a hermetically sealed battery as described above could be adapted to systems other than the lead-acid system, e.g., nickel-cadmium, silver-cadmium, silver-zinc, manganese dioxide-cadmium and manganese dioxide-zinc.

What is claimed is:

1. A rechargeable storage battery comprising a hermetically sealed container, and in said container a positive and a negative electrode in contact with an electrolyte, a recombination catalyst for promoting the recombination of oxygen and hydrogen gas evolved at said positive and negative electrodes to form water, said recombination catalyst comprising a noble metal deposited on a high surface area base, and means for physically separating said recombination catalyst from said electrolyte while at the same time providing access of evolved oxygen and hydrogen gas to said recombination catalyst.

2. A rechargeable storage battery as described in claim 1 wherein said recombination catalyst comprises from about 0.1 to about 10 milligrams of a noble metal deposited on a base, said base having a surface area of from about 100 to about 500 square meters per gram of base material.

3. A rechargeable storage battery comprising a hermetically sealed container having at least two compartments, one compartment containing a positive and a negative electrode in contact with a liquid electrolyte and the other compartment containing a recombination catalyst for promoting the recombination of oxygen and hydrogen gas evolved at said positive and negative electrodes to form water, said recombination catalyst being physically separated from said electrolyte by said compartments and comprising a noble metal supported on a high surface area base and means associated with said compartments for passing said evolved oxygen and hydrogen gas from said one compartment containing said positive and negative electrodes into said other compartment and into contact with said recombination catalyst.

4. A rechargeable storage battery as described in claim 3 wherein the noble metal is deposited on a base of particulate material, said particulate material having a particle size of from about 0.5 to about 4 millimeters.

5. A rechargeable storage battery as described in claim 3 wherein said high surface area base comprises a particulate material selected from the group consisting of activated carbon, activated alumina, and activated silica.

6. A rechargeable storage battery comprising an outer container having a cover hermetically sealed to its upper end and, disposed within said outer container, at least one cell compartment containing a liquid electrolyte and a positive and negative electrode in contact with said electrolyte and another compartment containing a recombination catalyst for promoting the recombination of oxygen and hydrogen gas evolved at said positive and negative electrodes to form water, said cell compartment physically separating said recombination catalyst from said electrolyte and having a gas-permeable cover member providing a means for passing said oxygen and hydrogen gas from said cell compartment into said other compartment and into contact with said recombination catalyst, said recombination catalyst comprising a noble metal deposited on a particulate base of a material selected from the group consisting of activated carbon, activated alumina, and activated silica.

7. A rechargeable storage battery as described in claim 6 wherein said recombination catalyst comprises from about 0.1 to about 10 milligrams of a noble metal per gram of base and wherein said base has from about 100 to about 500 square meters of surface area per gram.

References Cited by the Examiner
UNITED STATES PATENTS

| | | | |
|---|---|---|---|
| 2,131,592 | 9/1938 | Lange et al. | 136—179 |
| 2,894,914 | 7/1959 | Hassler et al. | 252—447 X |
| 2,928,889 | 3/1960 | Bonner et al. | 136—24 |
| 2,934,581 | 4/1960 | Dassler | 136—9 |
| 3,045,054 | 7/1962 | Holm et al. | 252—447 X |
| 3,097,974 | 7/1963 | McEvoy et al. | 136—120 |
| 3,113,048 | 12/1963 | Thompson | 136—86 |
| 3,170,816 | 2/1965 | Voss et al. | 136—3 |

WINSTON A. DOUGLAS, *Primary Examiner.*

MURRAY TILLMAN, *Examiner.*

B. J. OHLENDORF, *Assistant Examiner.*